United States Patent
Oomura et al.

(10) Patent No.: US 6,904,810 B2
(45) Date of Patent: Jun. 14, 2005

(54) PURGE TYPE VORTEX FLOWMETER

(75) Inventors: Minoru Oomura, Tokyo (JP); Jun Tanimoto, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 10/487,845
(22) PCT Filed: Oct. 30, 2002
(86) PCT No.: PCT/JP02/11343
§ 371 (c)(1), (2), (4) Date: Feb. 26, 2004
(87) PCT Pub. No.: WO03/040663
PCT Pub. Date: May 15, 2003

(65) Prior Publication Data
US 2004/0231430 A1 Nov. 25, 2004

(30) Foreign Application Priority Data
Nov. 7, 2001 (JP) .................................... 2001-342196

(51) Int. Cl.$^7$ ................................. G01F 1/32
(52) U.S. Cl. ................................. 73/861.22
(58) Field of Search .................. 73/861.22, 861.42, 73/861.21, 861.55

(56) References Cited

U.S. PATENT DOCUMENTS

| 3,691,830 A | * | 9/1972 | Tomota et al. | ........... 73/861.22 |
| 3,777,563 A | * | 12/1973 | Yamasaki et al. | ........ 73/861.22 |
| 5,908,990 A | * | 6/1999 | Cummings | ............... 73/861.22 |

FOREIGN PATENT DOCUMENTS

| JP | 49-32152 | 8/1974 |
| JP | 62-13606 | 3/1987 |
| JP | 63-35925 | 7/1988 |
| JP | 5-47380 | 12/1993 |

* cited by examiner

*Primary Examiner*—Edward Lefkowitz
*Assistant Examiner*—Jewel V Thompson
(74) *Attorney, Agent, or Firm*—Jordan and Hamburg LLP

(57) ABSTRACT

A purge type vortex flowmeter capable of accurately measuring a flow rate of fluid over a wide range by reliably detecting the number of vortexes produced. A purge type vortex flowmeter which comprises a vortex generator (2) mounted in a passage of fluid to be measured in a flow pipe (1), two conduits (4a, 4b) having pressure ports (3a, 3b) in both side surfaces of the vortex generator for communication with the outside thereof and a front conduit (4c) having a pressure port (3c) in the front surface of the vortex generator. Purge fluid from a purge supply source is fed by a purge introducing means through a tube (5), the conduits (4a, 4b) and the front conduit (4c) into a flow of fluid to be measured in the flow pipe. Purge streams alternatively fluctuating by the effect of a difference from a fluctuating vortex pressure are discharged from the conduits (4a, 4b) through their pressure ports (3a, 3b). The fluctuations of the purge streams are detected by sensors (heat-sensitive elements (7a, 7b)) mounted in the conduits (4a, 4b). The purge fluid to be discharged through the pressure port (3c) varies its flow in accordance with the flow of the fluid to be measured in the flow pipe (1), thereby achieving automatic control of the purge flow to the sensor portion.

2 Claims, 8 Drawing Sheets

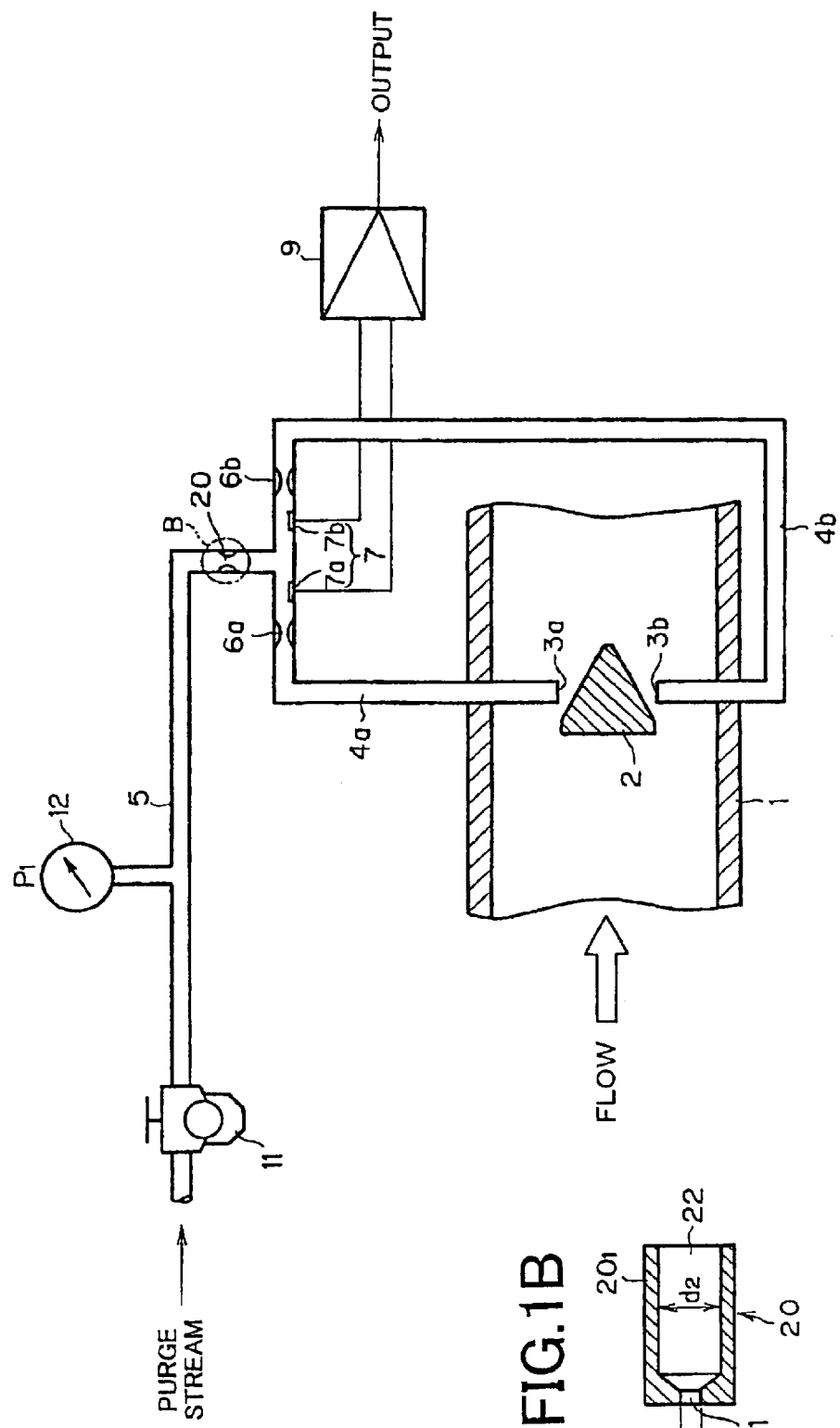

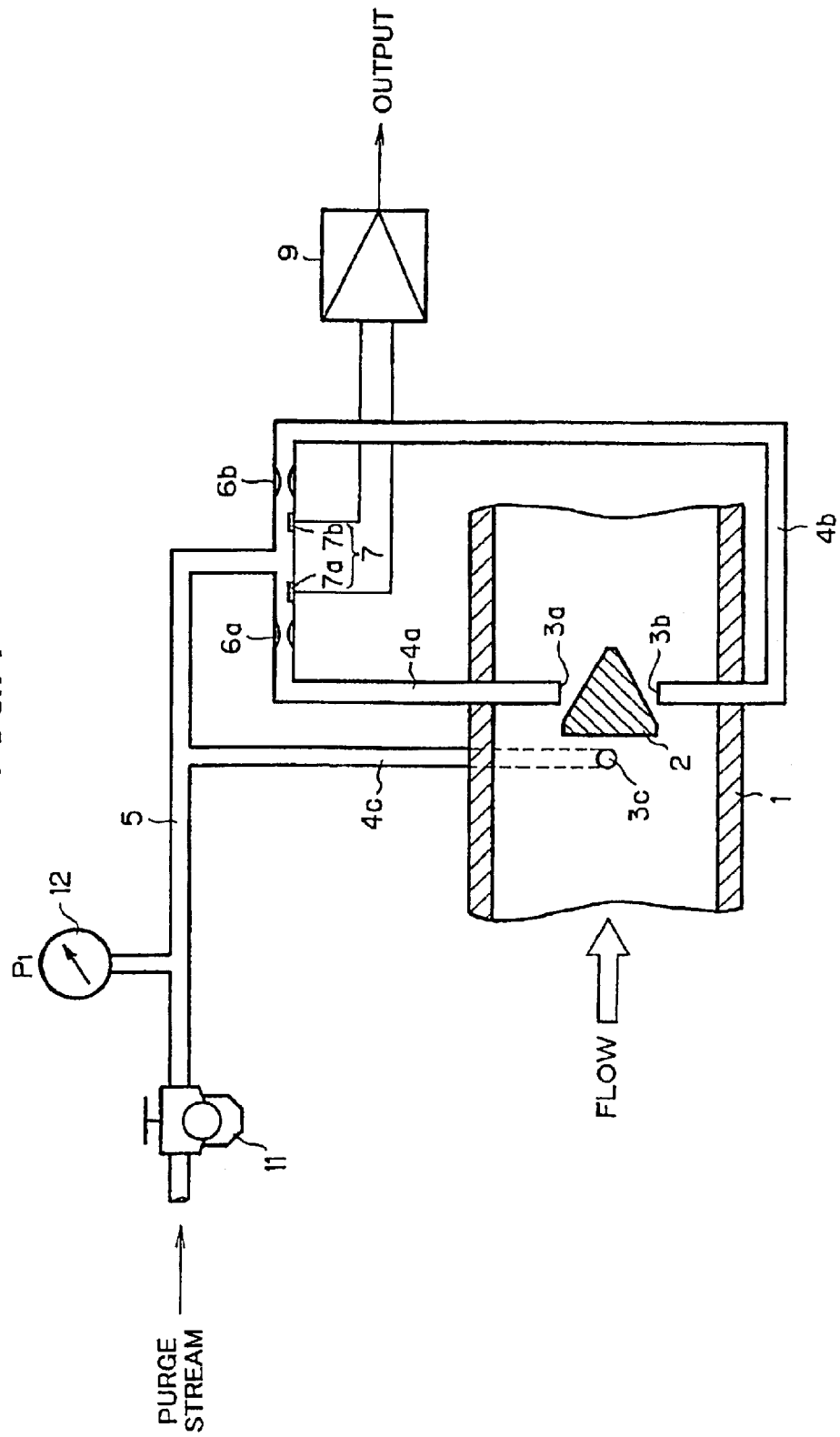

PURGE TYPE VORTEX FLOWMETER

TECHNICAL FIELD

The present invention relates to a purge type vortex flowmeter for detecting a signal of vortex generated by a vortex generator in a flow pipe.

BACKGROUND ART

In most of vortex flowmeters based on the theory that the number of Karman's vortexes generated per unit time by a vortex generator mounted in a passage of the fluid flowing in a flow pipe is substantially proportional to a flow rate of fluid, heat-sensitive elements are used for detecting a Karman's vortex street because it is compact and cheap. Typical heat-sensitive elements may be, for example, a heat wire, a metal foil and a thermistor. It is connected to and heated by a constant voltage or constant current power source. A fluctuation of a flow of fluid with a vortex street generated therein causes the heated heat-sensitive element to radiate and varies its resistance. A variation of resistance of the heat-sensitive element is converted through a bridge circuit into a current or voltage signal. The measured signal can have a specified voltage or current value if the measurement was conducted with the same fluid at the same temperature and the same flow rate. However, the measurement of the same fluid may have variations if the fluid varied its temperature and/or included dirty particles causing the sensing element to vary its radiation coefficient. The latter is irrevocable with a heat-sensitive element working in direct contact with the fluid. The above-mentioned problem may be solved by a known method of detecting a variation in a stream of clean purge gas such as air and nitrogen gas, which can vary its resistance with a change of a fluctuating vortex pressure of the fluid to be measured. Namely, the sensing element can measure a stream of clean purge gas in place of fluid to be measured. This enables the sensing element to indirectly measure the flow rate of dirty or high-temperature or low-temperature fluids which cannot be measured by the conventional method.

However, a vortex signal having a high S/N ratio cannot be obtained only by the introduction of a purge stream to convert a vortex signal to a purge signal. A conventional method to solve the above problem was described in Japanese Patent Publication No. 62-13606, which method is to detect a vortex signal with a high S/N ratio by a substitution method by feeding a constant purge stream of inert gas (such as nitrogen, and air) from an inert-gas supply source disposed outside the flow meter. This method, however, requires the use of an expensive flow meter capable of measuring and monitoring a purge flow to obtain vortex signals having high S/N ratios over a wide range of measurement of flow rates. Furthermore, the above-described method has such a disadvantage that a flow rate of purge gas must be accurately adjusted by means of a control valve to a specified value allowing the flowmeter to reliably measure the purge flow even if the fluid pressure of the fluid changes.

To solve the above-mentioned drawbacks of the conventional method, the present applicant proposed a vortexflow meter in Japanese Utility Model Publication No. 5-47380, which flowmeter is intended to operate with no need of conducting adjustment of the purge flow and no need of using an expensive device. This was achieved by using a critical purge stream generated by a throttling means operating on the condition that a ratio of a purge gas pressure to a pressure at an open end of each conduit. Namely, the purge flow can be always maintained at a constant value independent of pressure variations of fluid to be measured. The flowmeter can thus be constructed with use of a cheap orifice plate and a critical nozzle as the throttling means: the throttling means is mounted in a middle position of a conduit tube with a vortex sensing element, into which a constant flow of purge gas is fed.

FIGS. 1A and 1B shows an exemplified construction of a conventional purge type vortex flowmeter which corresponds to the vortex flowmeter described in Japanese Utility Mode Publication No. 5-47380. The purge type vortex flowmeter shown in FIG. 1A includes a vortex generator 2 mounted in a flow pipe 1 and conduits 4a and 4b (normally represented by a conduit 4) penetrating into the inside of the flow pipe 1 through the wall thereof and having pressure ports 3a and 3b in neighborhood of the both corresponding sides of the vortex generator 2. Purge streams alternatively fluctuate and flow out through the pressure ports 3a and 3b of the conduits 4 by the effect of the fluctuating vortex pressure. The fluctuations of the purge flow in the conduits 4a and 4b are detected by sensing elements 7a and 7b.

The sensing elements 7a and 7b may be heat-sensitive elements such as for example heat wires and thermistors. The heat-sensitive elements 7a and 7b to be used in contact with a purge stream are disposed between paired throttling elements 6a and 6b arranged in the middle of the conduit 4 (in the boundary portion between the conduits 4a and 4b). These heat-sensitive elements 7a and 7b form respective arms of a bridge circuit (not shown). The paired throttling elements are slightly separated from each other to form a laminar flow in the middle portion of the conduit 4 to remove a noise component. A stream of purge gas (air or nitrogen) from the high-pressure inert gas supply source is supplied to the middle portion of the conduit 4 and detected by the heat-sensitive elements 7a and 7b disposed therein. Detection signals from the heat-sensitive elements 7a and 7b are transferred through lead wires to an amplifier 9 whereby they are amplified. The amplified detection signals are cleaned off noise components by a filter circuit and then outputted as respective vortex signals.

In order to maintain the constant supply of the purge flow, a throttling element 20 is mounted in an upstream purge tube (small-diameter tube) 5 connected to the middle portion of the conduit 4 in which the heat-sensitive elements 7a and 7b are disposed. An example of an orifice plate $20_1$ serving as the throttling element 20 is shown in FIG. 1B. This throttling element 20 has a small diameter (d1) inlet 21 and a large diameter (d2) outlet 22 and a purge gas stream flows in the direction shown by an arrow. Let assume that a purge stream has a pressure P2 at the outlet and a pressure P1 at the inlet of the throttling element 20. When a ratio of the outlet pressure P2 to the inlet pressure P1 is increased equal to and grater than the critical pressure ratio, the purge stream from the outlet 22 obtains a velocity equal to the sound velocity and becomes a well-known constant mass flow free from the influence of pressure variations of the purge stream on the downstream side. More precisely, the flow rate of the outlet purge stream may vary with variations of pressure, temperature and humidity of the inlet side purge stream but the variations of the outlet stream may be negligible and does not cause any problem in regard to the accuracy of the purge flowrate. The purge flowrate can be changed by changing the area (diameter d1) of the inlet 21. Since the critical pressure ratio P2/P1 of purge air is equal to 0.528, a pressure reducing valve 11 may be adjusted so that the pressure P1 of supply purge air indicated on a pressure gauge 12 may be high enough to allow the throttling element 20 to obtain the critical ratio of the supply gas pressure P1 to the purge air pressure P2 to be measured. Even if variation of the gas pressure P1 to be measured occurred, a constant purge stream can be supplied into the system as far as the above-mentioned condition is maintained.

As described above, the vortex flowmeter disclosed in Japanese Utility Model Publication No. 5-47380 can introduce an accurate purge stream by using merely a simple and cheap throttling element such as for example an orifice plate (without applying any expensive flowmeter and flow control elements such as valves) and eliminates the need of adjusting valves even with a change in the gas pressure to be measured (with no need of using pressure control means).

FIGS. 2A and 2B shows another exemplified construction of conventional purge type vortex flowmeter which differs in construction from the flowmeter of FIGS. 1A and 1B by arrangement of purge conduit tubes 4 and positions of exhaust ports serving as pressure ports. In this purge type vortex flowmeter, a vortex generator 2 is mounted in a passage of fluid flowing in a flow pipe 1 and conduits 4a and 4b extend through the vortex generator 2 to respective external side surfaces thereof whereat they communicates at their pressure ports 3a and 3b with the fluid passage in the flow pipe 1. In the same way as described for the flowmeter of FIGS. 1A and 1B, this vortex flowmeter can supply clean purge fluid such as nitrogen gas from the external purge gas source through the respective conduits into the passage along the both sides of the vortex generator 2 and detect alternative changes of the purge streams by the effect of Karman's vortexes produced by the vortex generator by using flow velocity sensors such as thermistors. Since the detecting sensors can work not in direct contact with the fluid to be measured, this flowmeter can measure a flow rate of dirty fluid or high-temperature fluid or low-temperature fluid which could not be measured by the conventional flowmeters.

However, the quality of detection signals obtained by the sensors depends on a flowrate of purge gas flowing along the working surfaces of the sensors. Namely, the larger a flow of fluid flowing in the flow pipe (the larger an alternating differential karman's vortex pressure is), the larger a purge flow is required by the sensor portion. On the contrary, the smaller a flow of fluid flowing in the flow pipe (the smaller an alternating differential Karman's vortex pressure is), the smaller a purge flow is required by the sensor portion. To always obtain high-quality sensor signals, it is necessary to control the flowrate of the purge gas in accordance with the flowrate of the fluid to be measured flowing in the flow pipe. As described above, the vortex flowmeters are featured by supplying a constant flow of the purge gas to the sensors. However, it cannot control in practice the purge gas flow in response to a change in flowrate of the fluid in the flow pipe. As the result of this, the stabilized and high-quality detection signals cannot be obtained, thereby the number of vortexes produced per unit time can not accurately measured.

SUMMARY OF THE INVENTION

The present invention has as its primary object the provision of a purge type vortex flowmeter which is capable of accurately measuring the number of vortexes produced per unit time even if the fluid velocity to be measured varies over a wide range, thereby achieving the accurate measurement of flowrate of the fluid flowing in the flow pipe.

Another object of the invention is provide to a purge type vortex flowmeter which comprises a vortex generator mounted in a passage of fluid to be measured flowing in a flow pipe; two side conduits each having one end opened to side surfaces of the vortex generator respectively, and communicated with the fluid of the flow pipe; a front conduit having one end opened to a front surface of the vortex generator, and communicated with the flow pipe; and a purge injecting means for supplying a constant flow of purge fluid from a purge supply source into the other end of conduits and discharging purge streams through the conduits into a stream of the fluid flowing in the flow pipe, wherein each vortex generated by the vortex generator is detected as a signal of fluctuation of a flow rate or flow velocity of the purge fluid flowing in the side conduits in response to a fluctuating pressure of the vortex produced in the fluid flowing in the flow pipe.

Another object of the invention is provide to a purge type vortex flowmeter which comprises a vortex generator mounted in a passage of fluid to be measured flowing in a flow pipe; two side conduits each having one end disposed in neighborhood of side surfaces of the vortex generator respectively and communicated with the outside of the flow pipe; a front conduit having one end opened to a front surface of the vortex generator and communicated with the flow pipe; and a purge injecting means for supplying a constant flow of purge fluid from a purge supply source into the other end of conduits and discharging purge streams through the conduits into a stream of the fluid flowing in the flow pipe, wherein each vortex generated by the vortex generator is detected as a signal of fluctuation of the flow rate or flow velocity of the purge fluid flowing in the side conduits in response to a fluctuating pressure of the vortex produced in the fluid flowing in the flow pipe.

BRIEF DESCRIPTION OF DRAWINGS

FIGS. 1A and 1B are exemplified construction views of a purge type vortex flowmeter according to a prior art.

FIG. 4 is another exemplified construction view of a purge type vortex flowmeter according to another embodiment of the present invention.

BEST MODE FOR CARRYING OUT THE INVENTION

Figure 2A:
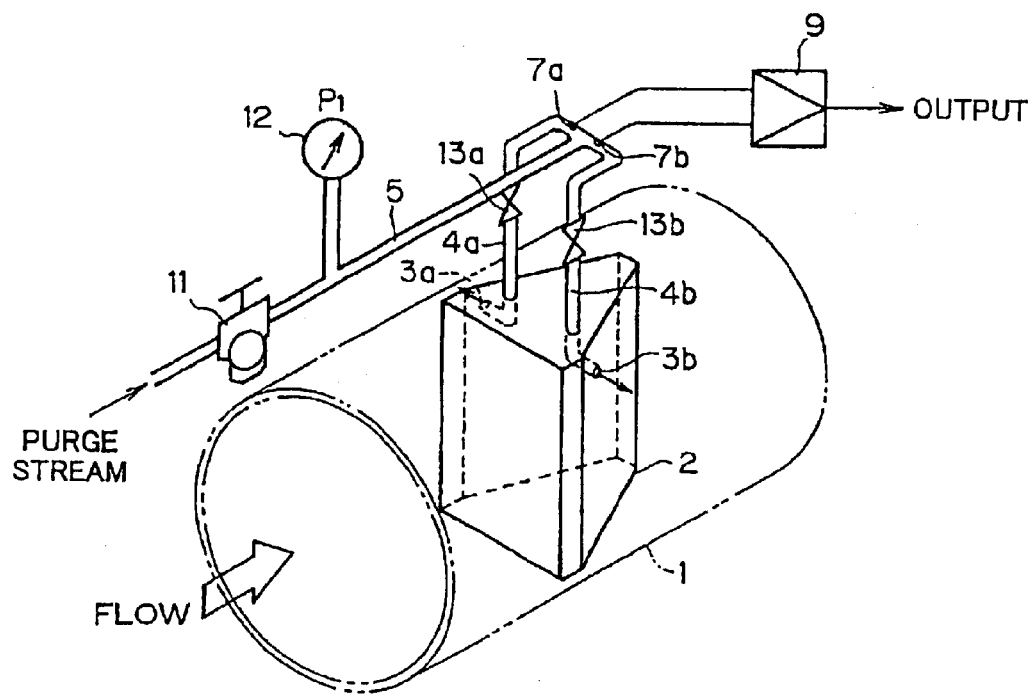
FIGS. 2A and 2B are other exemplified construction views of a purge type vortex flowmeter wherein the arrangement of the conduits and pressure ports are different.
Figure 2B:
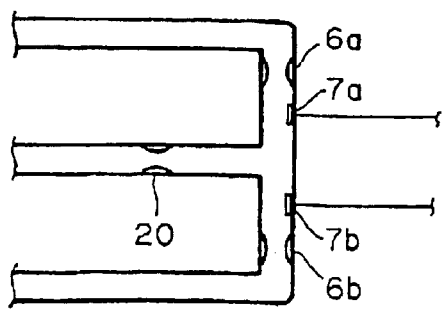
Figure 3A:
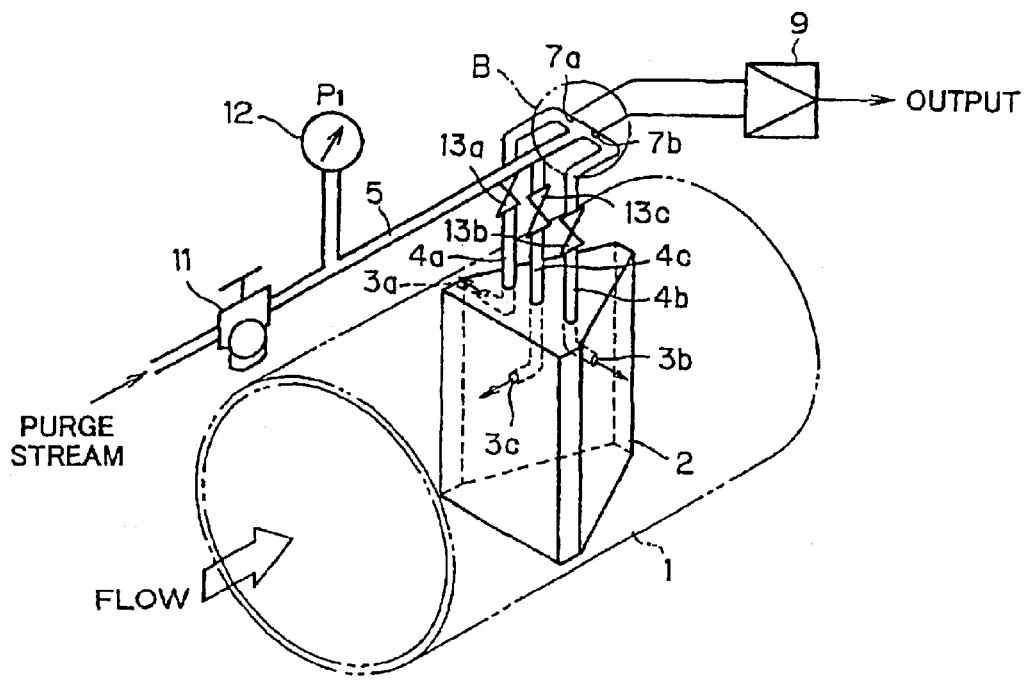
FIGS. 3A and 3B are other exemplified construction views of a purge type vortex flowmeter wherein the arrangement of the conduits and pressure ports are different.
Figure 3B:
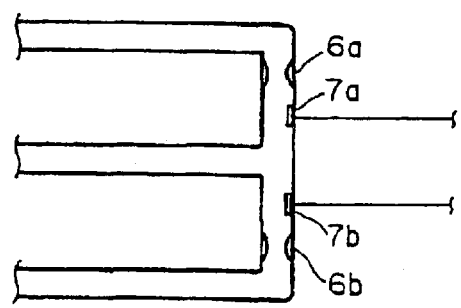

FIGS. 3A and 3B show exemplary constructions of a purge type vortex flowmeter embodying the present invention. The purge type vortex flowmeter according to this embodiment of the present invention comprises a vortex generator 2 mounted in a passage of fluid to be measured in a flow pipe 1, conduits 4a and 4b having open ends (or ended as pressure ports) 3a and 3b in the both side surfaces of the vortex generator 2 for communication with the passage of fluid to be measured, a front conduit 4c having an open end (pressure port) 3c in the front surface of the vortex generator 2. The front conduit 4c communicates at its open end with the fluid passage outside the vortex generator 2 and at its other end with the side conduits 4a and 4b.

Purge introducing means supplies a constant flow of purge gas from a purge gas supply source (a high-pressure gas supply source capable of supplying a constant flow of inert gas such as air and nitrogen gas) through a purge gas tube 5 (hereinafter referred to as a tube), conduits 4a, 4b and the front conduit 4c into the fluid to be measured flowing in the flow pipe 1. The purge gas stream is forced into a flow of fluid to be measured through the pressure ports 3a and 3b, alternatively varying its flow rate by the effect of fluctuating differential pressures of vortexes alternatively departing from the vortex generator 2. The alternative fluctuating flows of the purge gas in both conduits are detected by respective sensing elements mounted in each of the conduits 4a and 4b. The purge gas flow from the purge supply source through the tube 5 is distributed to three-way branches (conduits 4a, 4b and 4c) wherefrom three streams of purge fluid is discharged through respective pressure ports 3a, 3b and 3c into the fluid to be measured flowing in the flow pipe 1. The purge stream from the front conduit 4c through the port 3c in the front surface of the vortex generator 2 can vary in accordance with variation of the flow rate of fluid to be measured passing in the flow pipe 1, thereby realizing automatic adjustment of the flow rate of purge gas in each of the conduits 4a and 4b. The pressure of purge gas to be supplied from the purge supply source may be preliminarily adjusted to a value adapted to a selected kind of purge gas by using a valve (pressure reducing valve) 11 provided for adjusting the supply of purge gas from the purge supply source and a pressure gauge 12 provided for measuring a pressure of a purge gas flow in the purge supply line.

Detecting elements are requested to detect signals of vortexes produced by the vortex generator 2 as fluctuation signals of flow rate or velocity of purge gas flowing in the conduits 4a and 4b, i.e., as differential signals of purge flow rate or velocity. Typically, heat-sensitive elements such as for example heat wires or thermistors are used and mounted in each of the conduits 4a and 4b. The heat-sensitive elements 7a and 7b shown in FIGS. 3A and 3B to work in contact with purge streams are disposed between paired throttling elements 6a and 6b disposed in a downstream portion branching from a purge supply tube 5 into the conduits 4a and 4b. These heat-sensitive elements form respective arms of a bridge circuit (not shown). The purge stream fed from the purge supply source flows in the tube 5 and divides into three streams which flow respectively in the conduits 4c, 4a and 4b. In the conduits 4a and 4b, the purge gas streams flow along the respective sensing elements 7a and 7b for detecting the fluctuations of the respective purge streams. The paired throttling elements 6a and 6b is disposed as slightly separated from each other to convert the fluctuating flow into a laminar flow in the branching portion of the conduit 4, thereby eliminating a noise component. The use of the throttling elements may be effective in many cases. Detection signals from the heat-sensitive elements 7a and 7b are transferred through lead wires to an amplifier 9 whereby they are amplified. The amplified detection signals are cleaned off noise components by a filter circuit and then outputted as vortex detection signals. In this vortex flowmeter, clean purge fluid such as nitrogen gas from the external purge gas supply is discharged from the conduits disposed in both side surfaces of the vortex generator 2 and an alternating change of the purge fluid flow by the effect of Karman's vortexes produced by the vortex generator is detected by using flow velocity sensors such as thermistors. Since the sensors works not in direct contact with the fluid to be measured, this flowmeter can be used to measure a flow of dirty or high-temperature or low-temperature fluid, which cannot normally be measured. The conduits 4a, 4b and 4c may be provided with needle valves 13a, 13b and 13c respectively. By shutting off these valves 13a, 13b and 13c and the valve 11, it is possible to do maintenance of the sensors 7a and 7b without stopping the flow in the main flow pipe 1.

FIG. 4 shows an example of a vortex flowmeter which differs from the flowmeter shown in FIGS. 3A and 3B by arrangement of conduits and pressure ports, and this vortex flowmeter comprises a vortex generator 2 mounted with its front surface directed to upstream side in a passage of fluid to be measured in a flow pipe 1, two conduits 4a and 4b having open ends (pressure ports) 3a and 3b disposed adjacent to the both side surfaces of the vortex generator 2 in the flow pipe 1 and outwardly extending from the inside of the flow pipe 1 through both side walls thereof, a front conduit 4c having an open end (a pressure port) 3c disposed on the upstream side of the vortex generator 2 and communicating with the outside of the flow pipe 1 and the conduits 4a and 4b. The front conduit 4c may be disposed at its open end upstream and close to or separated from the front surface of the vortex generator 2. In the embodiment shown in FIG. 4, the side conduits 4a, 4b and the front conduit 4c penetrate respectively into the inside of the flow pipe 1 through the wall thereof and they are disposed at their open ends in the neighborhood of right, left and front surfaces, respectively, of the vortex generator 2.

Figure 5:
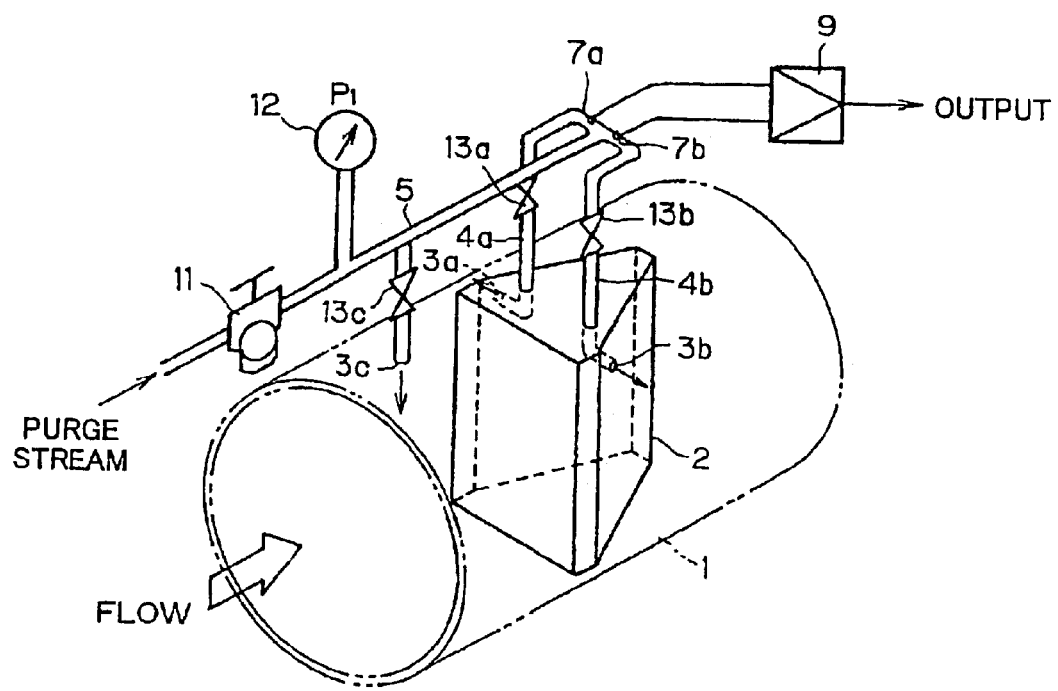
FIG. 5 is another exemplified construction view of a purge type vortex flowmeter according to another embodiment of the present invention.

In addition, the arrangement of the pressure ports 3a, 3b and 3c may be a modified combination of arrangements shown in FIGS. 3A, 3B and 4. In other words, two variants of arrangement of pressure ports are possible: one is that the pressure ports 3a, 3b are disposed as shown in FIGS. 3A and 3B and the pressure port 3c are disposed as shown in FIG. 4 and the other is that the pressure ports 3a, 3b are disposed as shown in FIG. 4 and the pressure port 3c is disposed as shown in FIGS. 3A and 3B. The former arrangement is shown by way of example in FIG. 5. The explanation on this embodiment is omitted because it is apparent from the descriptions of FIGS. 3A, 3B and 4.

The purge type vortex flowmeters described above as preferred embodiments of the present invention may be designed to allow fluid to be measured to flow through the measuring flow pipe or may be of the insertion type adapted to use in a large diameter flow piping wherein it measures a partial flow velocity of the same fluid. In the latter case, the flow of the fluid is determined from the measured partial flow velocity. In FIGS. 3A, 3B, 4 and 5, there is shown a vortex generator shaped as a triangular prism, which may have any other form allowing the stream of fluid to alternatively produce karman's vortexes on both sides thereof.

The arrangement of purge discharging ports in front of the front surface of the vortex generator and on the both sides thereof provides automatic control of the flow of purge fluid to the sensor portion in accordance with the flow of fluid to be measured in the flow pipe. This is further described below.

Figure 6:
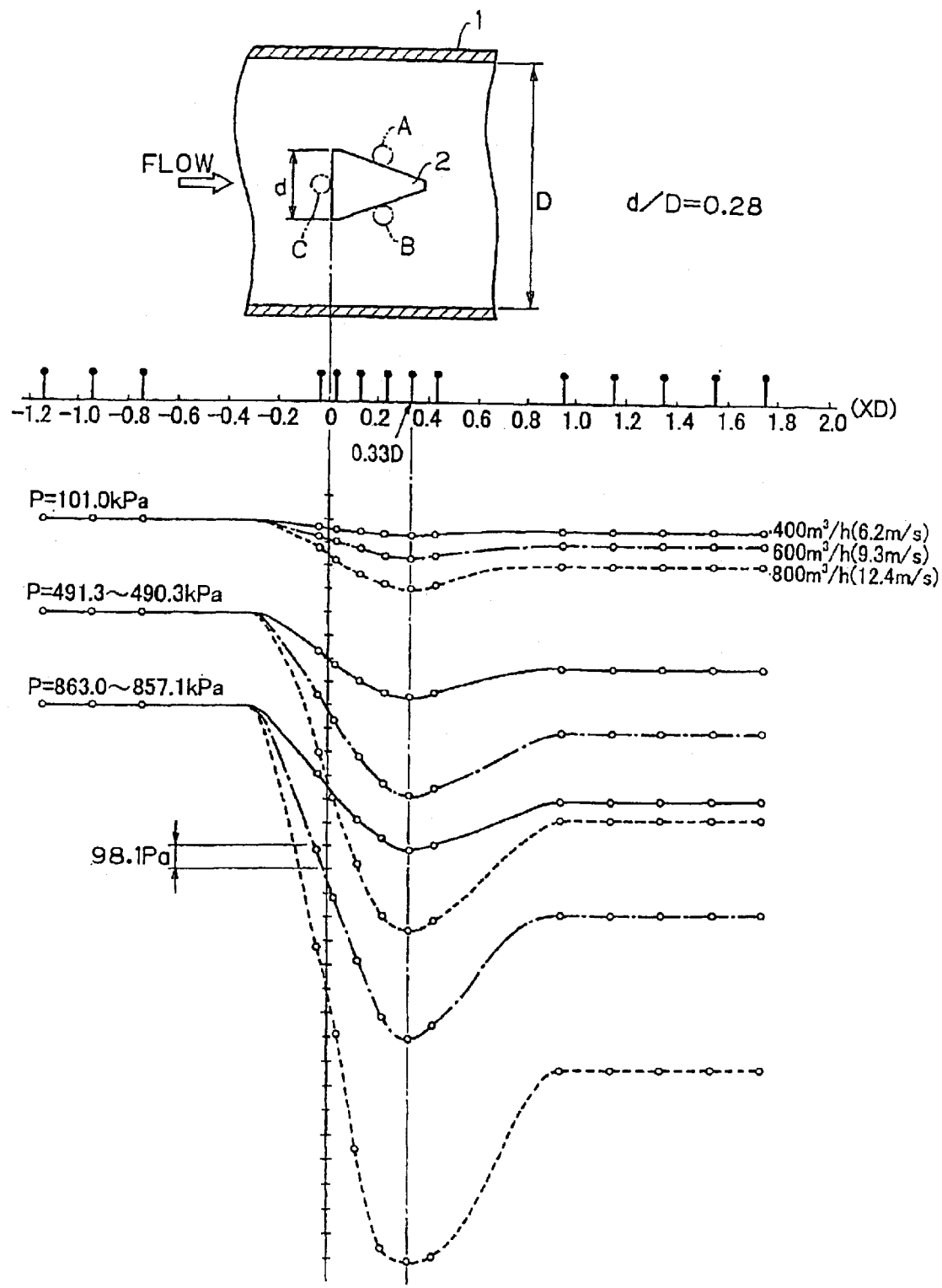
FIG. 6 shows the pressure distribution of fluid around a vortex generator of a purge type vortex flowmeter.

FIG. 6 shows the pressure distribution of fluid around a vortex generator of a vortex flowmeter. Pressures of fluid round a vortex generator 2 in a flow pipe 1 were measured on the following conditions:

The vortex flowmeter had a restriction ratio d/D of 0.28 (d is front surface width of the vortex generator 2 and D is an inner diameter of the flow pipe 1). In the condition that the flow rates of the fluid of 22.4° C. in the flow pipe 1 were 400, 600 and 800 m³/h (at flow velocity of 6.2, 9.3, 12.4 m/s respectively), the examination of the obtained pressure distribution of fluid around the vortex generator indicates the followings:

In every case when absolute pressures P measured on the upstream side at a sufficient distance from the vortex generator 2 was 101.0 kPa, 491.3 to 490.3 kPa and 863.0 to 857.1 kPa, in comparison with the pressures of fluid on the right side A, left side B and front side C of the vortex generator 2, which pressures correspond to pressures at the pressure ports 3a, 3b and 3c respectively in FIGS. 3A, 3B, 4 and 5 the pressure of fluid on the front side C compared with the pressures of fluid on the right side A and the left side B of the vortex generation increase as the fluid flow in the flow pipe 1 increases. This can be explained by the fluid resistance (pressure loss) to the vortex generator 2. If the constant purge flow is supplied from the external purge supply source, the increase of the fluid flow controls (reduces) the discharge of the purge fluid from the front pressure port 3c. As the result of this, the purge flow through the sensors into the pressure ports 3a and 3b. Consequently, the provision of the pressure port 3c on the front surface of the vortex generator can achieve automatic control of the purge flow to the respective sensors. This makes it possible to obtain the stabilized high-quality detection signals with no need of additional adjustment of purge by using additional control means.

Figure 7:
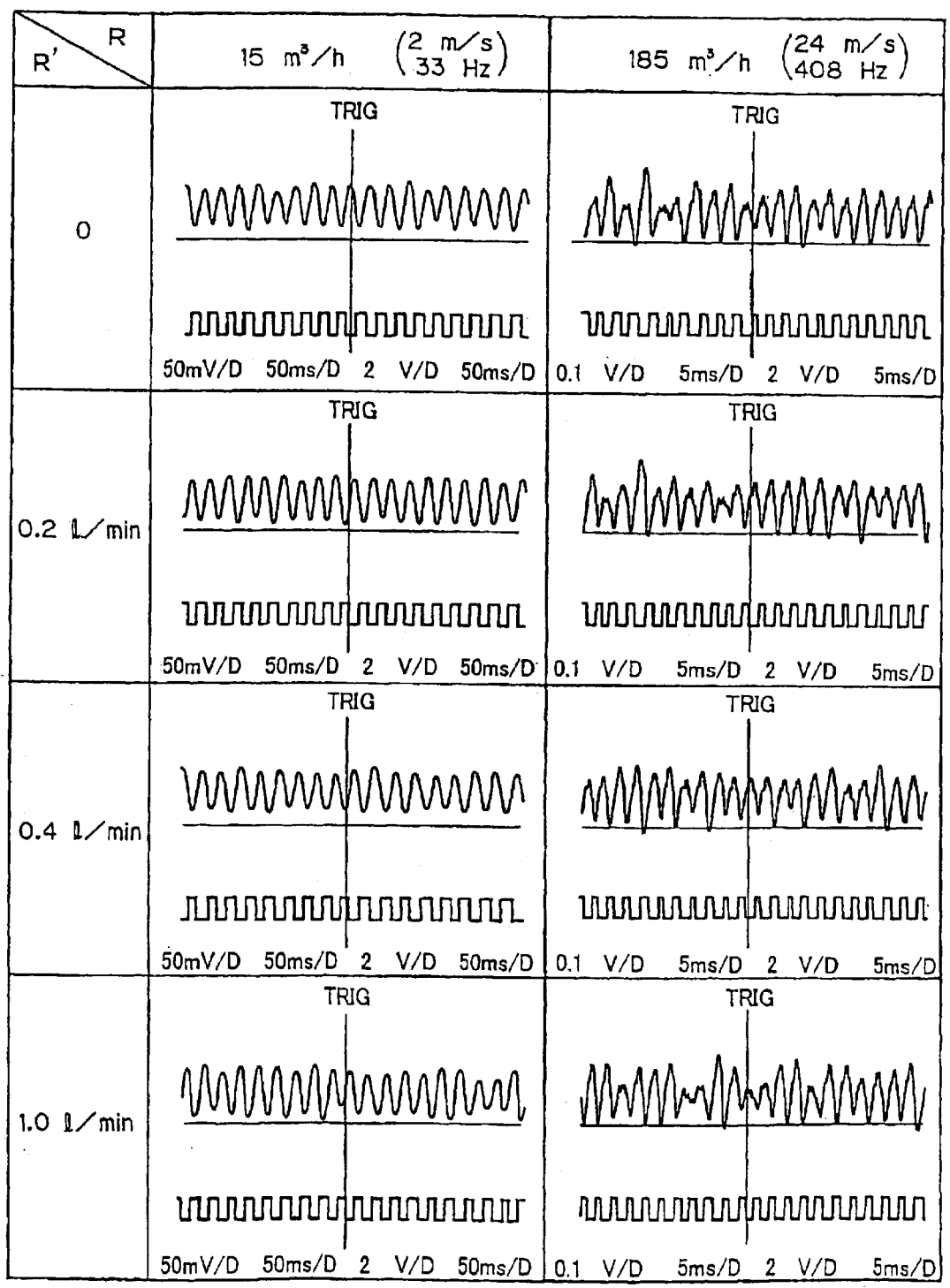
FIG. 7 is a view for explaining a relationship between flowrates of fluid to be measured, flowrates of purge fluid and waveforms of sensor detection signals of a purge type vortex flowmeter according to the present invention.

FIG. 7 shows the relationship between the flow of fluid R to be measured, the flow of purge fluid R' and the waveform of sensor detection signals of the purge type vortex flowmeter according to the present invention. The data was obtained by operating the flowmeter with the opened valve 13c of the conduit 4c as shown in FIGS. 3A and 3B.

Figure 8:
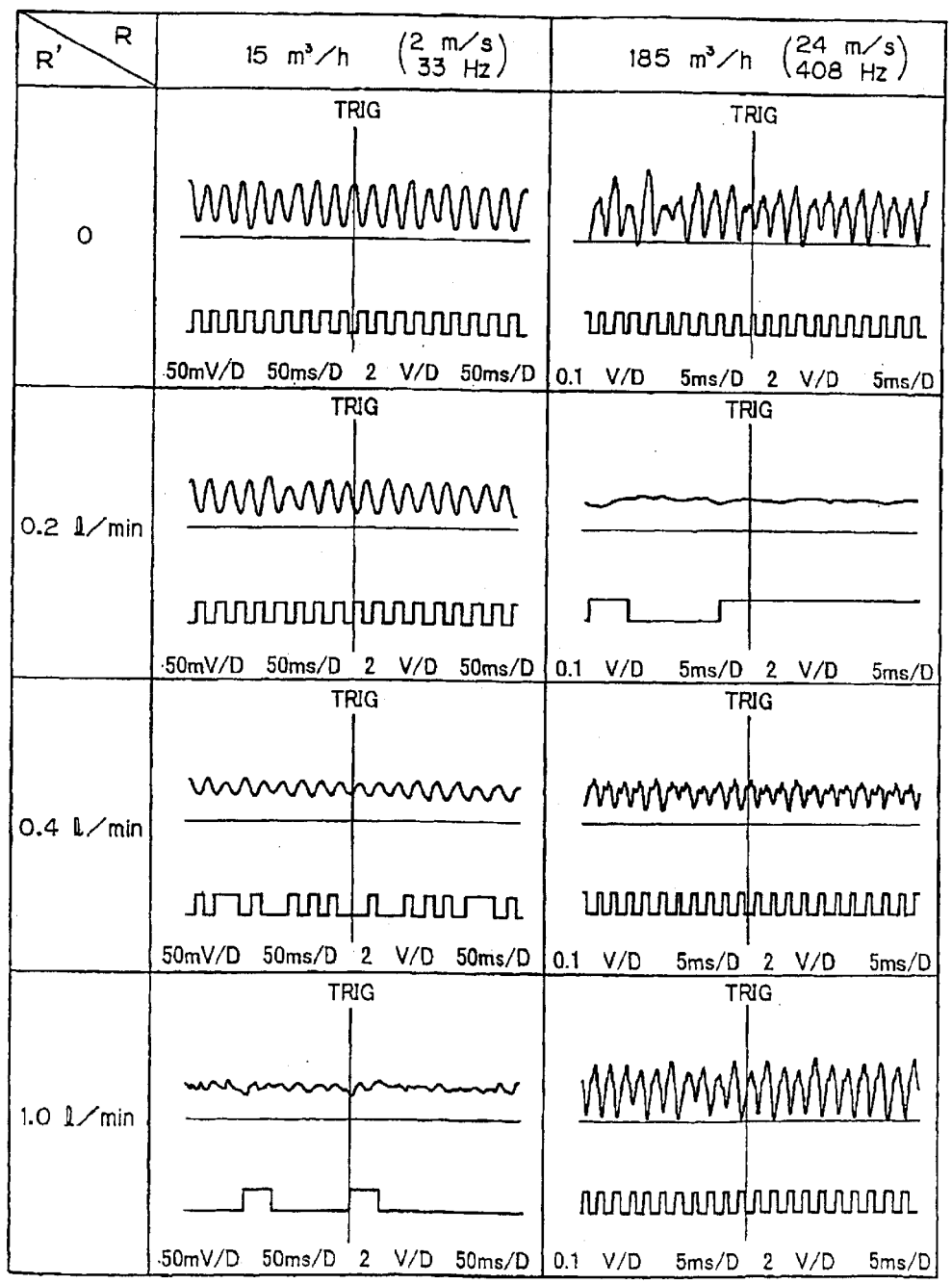
FIG. 8 is a view for explaining a relationship between flowrates of fluid to be measured, flowrates of purge fluid and waveforms of sensor detection signals of a purge type vortex flowmeter according to a prior art.

FIG. 8 shows the relationship between the flow of fluid R to be measured, the flow of purge fluid R' and the waveforms of sensor detection signals of the purge type vortex flowmeter according to the prior art, which may correspond, in practice, the state of the vortex flowmeter of FIG. 7 when the valve 3c of the conduit 4c is shut off. The waveforms of detection signals shown in FIGS. 7 and 8 were obtained at a typically small flow of 15 m³/h (2 m/s, 33 Hz) and a typically large flow 185 m³/h (24 m/s, 408 Hz) by supplying purge fluid R' from the purge supply source at flow rates of 0.0 (no purge), 0.2, 0.4, 1.0 (1/min). The purge fluid used was air (9.8 kPa). In the case that the purge flow R' was zero in FIG. 8, the valve 13c was released and the fluid to be measured was forced to flow through the sensor portion.

As shown in FIG. 8, the waveforms (detection signals) obtained by the prior art device indicate the fact that alternating changes of the purge flow by the effect of Karman's vortexes produced by the vortex generator become difficult to detect as the purge flow R' increases in the case that the flow of fluid to be measured is small in the flow pipe 1 and the alternating changes of the purge flow become impossible to detect as the purge flow R' decreases in the case that the flow of fluid to be measured is large in the flow pipe 1. Namely, as described before, the quality of detection signals generated by the sensors depends upon the flow of purge gas flowing along their working surfaces.

Namely, the larger a fluid flow in the flow pipe is (the larger an alternating differential pressure caused by the effect of a Karman's vortex street is), the larger the purge flow to the sensors is required. On the contrary, the smaller a fluid flow in the flow pipe is (the smaller an alternating differential pressure caused by the effect of a Karman's vortex street is), the smaller the purge flow to the sensors is required.

On the other hand, the waveforms of detection signals of the purge type vortex flowmeter according to the present invention (FIG. 7) apparently indicate that alternating changes of purge flow can be uniformly detected at any of the purge flows R' at both fluid flowrates R (=15 m³/h, 185 m³/h). This proves that discharge of purge gas from the port 3c of the front conduit 4c realizes automatic control of discharge of purge gas from the ports 3a and 3b of the conduits 4a and 4b. Namely, even if the fluid flow in the flow pipe 1 varies over the wide range, the purge type flowmeter according to the present invention can accurately measure the number of Karman's vortexes produced per unit time by the vortex generator in the flow pipe as far as the a purge fluid is supplied at a constant flow rate from the purge supply source.

The advantages of the present invention are as follows.

The purge type vortex flowmeter according to the present invention can always obtain stabilized high-quality detection signals of sensors over the wide range of fluid flow in the main pipe by virtue of supplying a constant purge flow from an external purge supply source with no need of additional control of the purge flow and can accurately measure the number of vortexes produced per unit time by the vortex generator and, therefore, accurately determine the flowrate of fluid in the main pipe.

What is claimed is:

1. A purge type vortex flowmeter for measuring fluid in a flow pipe comprising:

a vortex generator mounted in the flow pipe, said vortex generator having two side surfaces and a front surface;

two side conduits, each having an outlet opened to a respective side surface of the vortex generator, and each side conduit being adapted for communicating with fluid flowing in the flow pipe;

a front conduit having an outlet opened to the front surface of the vortex generator, and being adapted for communicating with fluid flowing in the flow pipe; and a purge injecting means for supplying a constant flow of purge fluid from a purge supply source into the two side conduits and the front conduit and discharging purge streams through the outlets of the two side conduits and through the outlet of the front conduit into a stream of fluid flowing in the flow pipe;

the system being adapted for detecting each vortex generated by the vortex generator as a signal of fluctuation of a flow rate or flow velocity of purge fluid flowing in the side conduits in response to fluctuating pressure of the vortex.

2. A purge type vortex flowmeter for measuring fluid in a flow pipe comprising:

a vortex generator mounted in the flow pipe, said vortex generator having two side surfaces and a front surface;

two side conduits, each having an outlet disposed near a respective side surface of the vortex generator, and each side conduit being adapted for communicating with fluid flowing in the flow pipe;

a front conduit having an outlet disposed near the front surface of the vortex generator, and being adapted for communicating with fluid flowing in the flow pipe; and a purge injecting means for supplying a constant flow of purge fluid from a purge supply source into the two side conduits and the front conduit and discharging purge streams through the outlets of the two side conduits and through the outlet of the front conduit into a stream of fluid flowing in the flow pipe;

the system being adapted for detecting each vortex generated by the vortex generator as a signal of fluctuation of a flow rate or flow velocity of purge fluid flowing in the side conduits in response to fluctuating pressure of the vortex.

* * * * *